US006570290B2

United States Patent
Kazmierczak

(10) Patent No.: US 6,570,290 B2
(45) Date of Patent: May 27, 2003

(54) SINGLE LAYER INTERSPERSED CONCENTRIC STATOR WINDING APPARATUS AND METHOD

(75) Inventor: Edmund E. Kazmierczak, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 09/893,607

(22) Filed: Jun. 29, 2001

(65) Prior Publication Data

US 2003/0001450 A1 Jan. 2, 2003

(51) Int. Cl.[7] .................................................. H02K 1/00
(52) U.S. Cl. .......................... 310/184; 310/198; 29/596
(58) Field of Search ................................ 310/184, 198, 310/201; 29/596

(56) References Cited

U.S. PATENT DOCUMENTS

| | | | | |
|---|---|---|---|---|
| 3,979,618 A | * | 9/1976 | Auinger | 310/198 |
| 4,028,572 A | * | 6/1977 | Baltisberger | 310/201 |
| 4,309,634 A | * | 1/1982 | Koroly et al. | 310/184 |
| 4,315,179 A | * | 2/1982 | Davey | 310/184 |
| 4,321,497 A | * | 3/1982 | Long | 310/198 |
| 4,492,890 A | * | 1/1985 | MacDonald | 310/184 |
| 5,018,676 A | * | 5/1991 | Gulbrandson | 242/433 |
| 5,055,729 A | * | 10/1991 | Fogarty et al. | 310/214 |
| 5,231,324 A | | 7/1993 | Kawamura et al. | 310/198 |
| 5,483,111 A | * | 1/1996 | Kuznetsov | 104/292 |
| 5,898,251 A | * | 4/1999 | Mochizuki et al. | 29/596 |
| 6,373,163 B1 | * | 4/2002 | Oohashi et al. | 310/184 |
| 6,376,775 B1 | * | 4/2002 | Leijon et al. | 174/128.1 |

* cited by examiner

*Primary Examiner*—Joseph Waks
(74) *Attorney, Agent, or Firm*—Nixon & Vanderhye P.C.

(57) ABSTRACT

A polyphase electrical machine having one or more stators, each stator having a plurality of phase windings, each phase winding having a plurality of concentric coils. One or more concentric coils of a phase winding are interspersed with one or more concentric coils of at least another phase winding to reduce undesirable harmonics and parasitic losses in the electrical machine. For single phase electrical machines, harmonic content and parasitic losses may be reduced by locating nested coils such that successive nested coils among a plurality of nested coils may have a span difference of greater than two stator slots.

30 Claims, 14 Drawing Sheets

17-15-11 PATTERN
2-POLE, 3-PHASE, 36SLOTS
SINGLE LAYER INTERSPERSED CONCENTRIC WINDING PATTERN 17-15-11 PATTERN
2-POLE, 3-PHASE, 36SLOTS
SINGLE LAYER INTERSPERSED CONCENTRIC WINDING PATTERN (35-33-31-27-25-19 PATTERN)
2-POLE, 3-PHASE, 72 SLOTS
SINGLE LAYER INTERSPERSED CONCENTRIC WINDING PATTERN 17-15-11 PATTERN
2-POLE, 3-PHASE, 36 SLOTS
SINGLE LAYER INTERSPERSED CONCENTRIC WINDING

SINGLE LAYER INTERSPERSED CONCENTRIC STATOR WINDING APPARATUS AND METHOD

FIELD OF THE INVENTION

This invention relates to single phase or polyphase electrical machines, and more particularly, to single layer interspersed concentric stator winding patterns for turbine generators and construction assemblies of SLIC windings.

BACKGROUND AND SUMMARY OF THE INVENTION

The fundamental elements common to a dynamo-electric machine or generator are a stator and a rotor. The stator includes a plurality of slots which are angularly and equally displaced along it's inner periphery. The rotor has one or more pairs of rotor magnetic poles which are created by permanent magnets or by a current carrying winding, or both. A current carrying winding is placed in the stator slots so as to create magnetic pole pairs on the stator which equal the number of rotor pole pairs. This winding is referred to as a stator winding. The stator for an ac machine can be wound for one or more phases (typically three). The peripheral span of one rotor pole or stator pole is called the "pole pitch".

Stator windings are generally differentiated as single layer windings or two-layer windings. Lap windings and concentric windings are generally known with respect to coil arrangements in three-phase armature windings. Concentric windings have been used on single phase fractional horsepower motors. Concentric windings, however, are rarely used on larger horsepower polyphase machines (ac). Concentric windings are typically used for stator windings on single phase fractional horsepower motors (ac) and for field (rotor) windings for turbine generators (dc).

In a lap winding, coils having substantially similar configurations and peripheral spans are placed one upon the other (typically in a two-layer arrangement) in a sequence, and laid in the slots of a stator core. Thus, electrical characteristics of each phase are balanced since the coils have similar configurations and winding resistances for each phase.

In concentric windings, a plurality of coils having different peripheral spans are laid in the stator core slots such that the coils are distributed to lie concentrically about a pole center. Nested coils are generally located in adjacent slots in prior approaches.

A traditional "concentric" or "chain" wound stator winding is one in which a phase winding includes a finite number of "nested" coils which are centered on the axis of the phase winding. The coils each have one or more turns of electrically conductive material (usually copper) which are interconnected in series with each other to form what is termed a "phase group". The interconnection of the coils in the "phase group" is made so that current will always flow in the same "sense" in each coil (either always in clockwise direction or always in counter-clockwise direction when viewed radially from the machine axial centerline).

To reduce harmonic content in the stator winding terminal voltage waveform and in the resultant stator winding magnetomotive force (MMF) waveform, usually a second "phase group" of coils is located one pole pitch away from the first "phase group" and is connected with the opposite "polarity" or opposite "sense" from the first "phase group" of coils. If the machine has more than two poles, then an additional phase group is added for each pole with connections made to reverse the polarity or current sense at each successive pole from that of the previous pole. The phase groups for the phase winding can then be carefully interconnected either in series, parallel, or series-parallel configurations via external conductors known as "phase connections". In addition, both conductors at the ends of the now interconnected phase winding are brought outside of the machine by additional phase connections so as to interconnect with an external power system.

In a traditional concentric winding, the "nested" coils in a "phase group" include an innermost short span coil which spans a smaller fraction of a pole pitch which is contained within longer span coils, each of the coils are progressively larger in span by two stator slots. The outermost coil in the nest usually spans a full pole pitch. The conductors of the phase winding of a traditional concentric winding are always located in "adjacent" stator slots. Most of the concentric windings in which alternating current (ac) flows have continuously wound phase windings. In other words, the phase winding coils are wound from continuous strands of conductors and no joints are made in the conductors except at the ends of the phase groups.

Polyphase concentric windings have additional phase windings identical to the first phase winding, but displaced on the periphery of the stator from the first phase winding by an angular span which is dependent on the number of phases and number of poles. The most common type of polyphase machine is the three-phase machine. In a three-phase machine, the second phase winding is physically displaced from the first phase winding by $(120)(2)/Np$ degrees, and the third phase winding is physically displaced from the first phase winding by $(240)(2)/Np$ degrees where "Np" represents the number of poles on the machine.

In single phase or polyphase rotating machines, one of the design considerations is the reduction in higher order harmonic magnitudes in the resultant stator winding MMF waveform. This is one of the desirable considerations of the present invention. The following description provides some background information on stator winding MMF for concentric windings. For example, consider a 2-pole, three-phase machine for analyzing the case of a dc (direct) current flowing through a single coil of a phase group. Further, assume that the coil spans a full pole pitch of the machine. If the coil MMF, represented an (Y-axis), is plotted as a function of the peripheral angular span of the inner surface of the stator core, represented an (X-axis), the MMF waveform would appear as a rectangular waveform having equal positive and negative amplitudes about a horizontal X-axis. In addition, the angular span of the positive half of the waveform would be identical to that of the negative half of the waveform. Each half of the waveform is determined to span one pole pitch.

Considering the case of another coil in the same phase group, except that this coil spans a small fraction of a pole pitch. Further, assuming that the dc current in this coil flows in the same "sense" as in the full pole pitch coil. The MMF for this coil would also be rectangular in shape, but is different from that of the full pole pitch coil. The fractional pitch coil has a positive amplitude which is larger than the negative amplitude about the horizontal X-axis. In addition, the angular span of the positive portion of the waveform would only be within the confines of the coil span. The negative portion of the waveform would span the remainder of the stator periphery outside of the fractional pitch coil span.

Similar logic may be applied to other fractional pitch coils within the phase group except that the positive and negative amplitudes would be different and the angular spans of the positive and negative portions of the waveforms would be different, due to the different span of each of these coils.

The second phase group of coils on the adjacent pole would have similar waveforms except that they would be displaced from those of the first phase group by one pole pitch. In addition, the waveforms of the second phase group would be "inverted" (mirror image about the horizontal X-axis) from those of the first phase group because the second phase group is connected with opposite polarity or opposite current "sense".

The combined or resultant MMF waveform of all the nested coils in the phase winding may be determined by summing the MMF contribution of each coil at every point on the inner periphery of the stator core. A stair stepped pattern above and below the horizontal X-axis would result for the case of dc current in the phase winding. This stair-stepped "space" pattern resembles a sinusoidal waveform. A Fourier Series Analysis may be made of the resultant phase winding MMF pattern in order to determine the magnitudes of the "fundamental" component and of the various higher order "space" harmonic components.

If alternating current (ac) is applied to the phase winding, then the amplitude of the MMF waveform would continuously pulsate with various amplitudes between the waveform's maximum positive and negative amplitudes. The ac current introduces "time" dependence into the phase winding MMF waveform. The other two phase windings of a three-phase winding, and their associated MMF waveforms would be displaced in space by 120 degrees and 240 degrees, respectively from the first phase winding. In addition, phase winding currents of the second and third phases would be of identical magnitude but out of phase in time by 120 degrees and 240 degrees, respectively from the current in the first phase winding.

The three individual phase winding MMF waves would combine into an overall resultant MMF wave for the stator. With balanced three-phase currents, the "fundamental" components of the phase winding MMF's would combine to create a resultant constant amplitude traveling MMF wave which travels at synchronous speed in the direction of rotor rotation. For a synchronous machine, the speed of the rotor and that of the resultant fundamental MMF field are identical, so that there is no relative motion between the two. However, the various other combinations of Fourier series space and time harmonics would result in additional harmonic rotating magnetic fields which are of different amplitudes and rotating in different directions and speeds relative to the rotor. These harmonic MMF waves will induce voltages and resultant currents and losses (typically referred to as "short-circuit pole face losses") on the surface of the synchronous machine rotor. These harmonic rotor surface currents may result in excessive heating of the rotor surface and rotor windings, and thus may potentially damage overlapping contact joints between current carrying components.

Therefore, it is desirable to reduce the higher order harmonic content or reduce the magnitude of the higher order harmonic components of the stator winding MMF waveform to enhance the performance of rotating machines. Although the above description was given for a 2-pole machine, the same concepts can be extended to describe stator winding MMF for machines with more than two poles.

Another of the desirable considerations of the present invention is the reduction in higher order harmonic magnitudes in the stator winding terminal voltage waveform. The following description provides some background information on stator winding terminal voltage waveform for concentric stator windings. For a generator operating under open-circuit stator conditions, the harmonic flux density waves produced by the rotating rotor with current flowing in it's rotor winding (or by permanent magnets or both) would link the nested (concentric) coils of each of the stator phase windings. These harmonic flux linkages vary with time due to the rotor rotation, and therefore induce terminal voltages in the phase windings in accordance with Faraday's Law. The peripheral spans of the nested coils as well as the number of coils influence the harmonic voltage content in the phase winding voltage waveform. Ideally, there would only be a fundamental sinusoidal component of induced voltage.

In reality, there are many higher order harmonic components of induced voltage. The higher order harmonics are not desirable in that some harmonic frequencies are known to cause humming or other extraneous noises in communication circuits located in close proximity to power lines running from the generator. Therefore, limits are placed on the harmonic content in the open-circuit terminal voltage waveform by industry standards for generators. The industry standards give "weighting factors" as a function of harmonic frequency according to the degree to which the frequencies influence communication circuits. The weighting factors, in turn, are used to calculate parameters known as "Telephone Influence Factors" (TIF) for which there are established maximum limits. Harmonics other than the fundamental are undesirable for rotating machine performance. Therefore, less harmonic voltage content or reduced harmonic voltage magnitudes are desirable for the design of rotating machines.

Accordingly, there is a need to reduce troublesome harmonics in the stator windings MMF waveform and the stator winding terminal voltage waveform of turbine generators.

The present invention relates to a single-layer-interspersed-concentric (SLIC) winding method. In one exemplary embodiment of the invention, the coils in each phase group of the SLIC winding may not be restricted to "adjacent" slots. Instead, the coils in a phase group may be located in any slots within the confines of a given pole so long as the coils are centered about a common axis (i.e. concentrically disposed around a common axis).

In another embodiment, the present invention relates to a polyphase electrical machine having one or more stators, each stator having a plurality of phase windings, each phase winding having a plurality of concentric coils. One or more concentric coils of a phase winding are interspersed with one or more concentric coils of at least another phase winding to reduce undesirable harmonics and parasitic losses in the electrical machine.

In another embodiment, the present invention relates to single phase electrical machines, wherein harmonic content and parasitic losses may be reduced by locating nested coils such that successive nested coils among a plurality of nested coils may have a span difference of greater than two stator slots.

In yet another embodiment, SLIC and concentric windings may be used for different stator winding assemblies.

In one aspect, a polyphase electrical machine, comprising at least one stator, each stator has a plurality of phase windings, each phase winding has a plurality of concentric coils. In the electrical machine, one or more concentric coils among the plurality of concentric coils of a phase winding are interspersed with one or more concentric coils of at least another phase winding to reduce harmonics and parasitic losses in the machine. Each stator of the machine includes one or more slots, and one or more stator slots comprise a conductor. Further, one or more stator slots comprises a stator bar. The concentric coils are made of insulated cable material, superconductor materials. Each coil is further made of a continuous conductor. In the electrical machine, end connection rings of the concentric coils are nested inside one another. Each concentric coil may include at least two turns. Each stator bar may be connected to the peripheral end connection rings. The two turns of the coils may be transposed to simplify joint assemblies of stator bars to the end connection rings. The electrical machine further includes means for supplying cooling liquid to cool the stator winding. Each coil of the electrical machine may include one turn.

In another aspect, a method of reducing harmonic content and parasitic losses in an electrical machine, said method comprising: providing at least one stator, each stator having a plurality of phase windings, each phase winding having a plurality of concentric coils; and peripherally interspersing one or more concentric coils of a phase winding with one or more concentric coils of at least another phase winding. The method further comprises connecting the phase windings in one of a series, parallel, or a combination of series and parallel configurations; and locating a stator bar in one or more of said stator slots. The method also comprises providing end connection rings to each concentric coil; providing each concentric coil with at least two turns; and transposing the at least two turns to simplify joint assemblies of stator bars to the end connection rings.

In yet another aspect, a polyphase electrical apparatus, comprising: at least two poles, each pole having a plurality of phase windings, each phase winding comprising a plurality of concentric coils disposed in corresponding armature core slots such that the armature core slots are formed into a nested peripheral endwinding arrangement; and at least one concentric coil of a phase winding is peripherally interspersed with at least one concentric coil of at least another phase winding to reduce harmonics and parasitic losses in the electrical apparatus.

In a further aspect, an electrical apparatus, comprising: at least one stator, said at least one stator comprising a phase winding and a plurality of slots, the phase winding comprising a plurality of nested coils, each nested coil centered on an axis of the phase winding; and wherein one or more successive nested coils among the plurality of nested coils may have a span length of greater than two stator slots to reduce harmonic content and parasitic losses in the apparatus.

In a further aspect, a method of reducing harmonic content and parasitic losses in an electrical apparatus, said method comprising: providing at least one stator, said at least one stator having a phase winding and a plurality of slots, the phase winding comprising a plurality of nested coils, each coil centered on the axis of the phase winding; and disposing each nested coil in at least one of the plurality of slots provided at least one of the plurality of slots is centered about an axis of the phase winding, and wherein one or more successive nested coils among the plurality of nested coils may have a span length of greater than two stator slots.

DETAILED DESCRIPTION OF THE INVENTION

Figure 1:
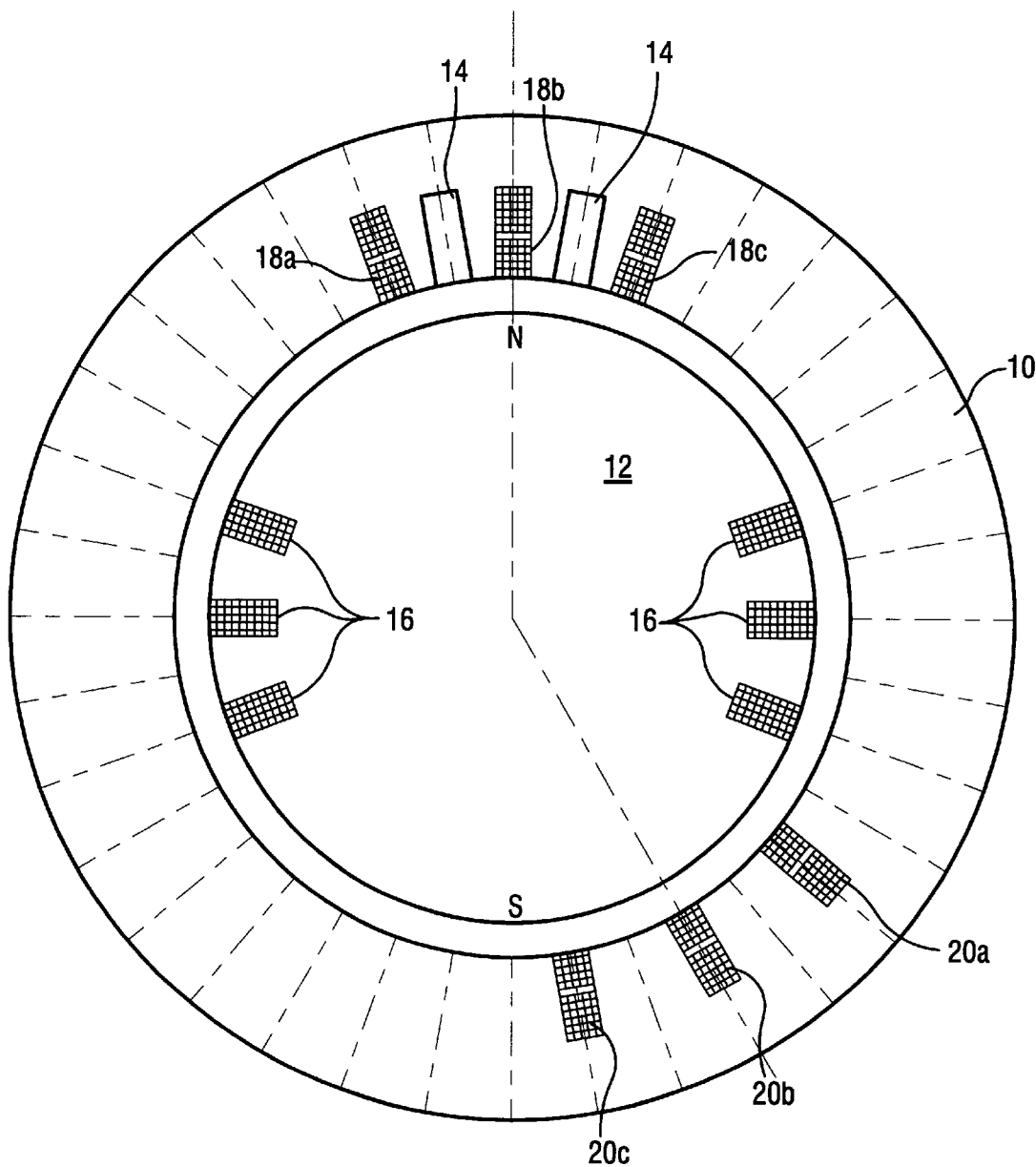
FIG. 1 is a sectional end view of a dynamoelectric machine illustrating the fundamental elements of the winding of the present invention.

FIG. 1 shows elements of a non-limiting example generator which includes a stator 10 and a rotor 12. The stator 10 includes a plurality of slots, a few of the slots being illustratively referenced at 14. Slot center lines disposed at equal angles around the stator indicate the position of additional slots similar to those identified at 14. The rotor 12 is depicted as having one pole pair, i.e., one pair of magnetic poles referenced N and S indicating, respectively, a north pole and a south pole. The rotor 12 may include any number of pole pairs. Conductors 16 occupying slots in the rotor comprise or form a rotor winding which produces the N-S pole pair indicated.

The most common arrangement for a large rotating machine utilizes a two-layer lap armature winding formed by conductors or coil sides which are received in slots 14 of the stator 10. Each stator slot 14 contains a top layer coil side and a bottom layer coil side. Top layer coil sides, a few illustratively shown at 18a, 18b, and 18c, occupy positions in the slots closest the rotor, and the bottom layer coil sides, a few illustratively shown at 20a, 20b, and 20c, occupy positions in the slots farthest removed from the rotor. Each top layer coil side is connected to a bottom layer coil side displaced by a full or fractional pole pitch from the top layer coil side to form a coil. The pole pitch is a measurement of the relationship of the top and bottom coil sides of a coil relative to the pole pairs of the rotor 12.

The coils thus formed may be connected in series, parallel, or in combinations of both to form phase belts. A typical phase belt is exemplified by the coils formed by connecting coil sides 18a and 20a, 18b and 20b, and 18c and 20c. Each electrical phase of an armature winding is formed by two phase belts per pole pair which may be connected in series or parallel. The two phase belts for each pole pair of an electrical phase are disposed in the stator slots with the top layer coil sides directly opposite a magnetic pole at the same point in the rotor rotation. The top layer coil sides 18a, 18b, 18c of the previously described phase belt are directly opposite the N magnetic pole of the rotor 12, and a second phase belt (not shown) directly opposite the S magnetic pole would be used to form one electrical phase. The SLIC winding arrangement of the present invention differs from the typical two-layer lap winding as described above.

Figure 2:
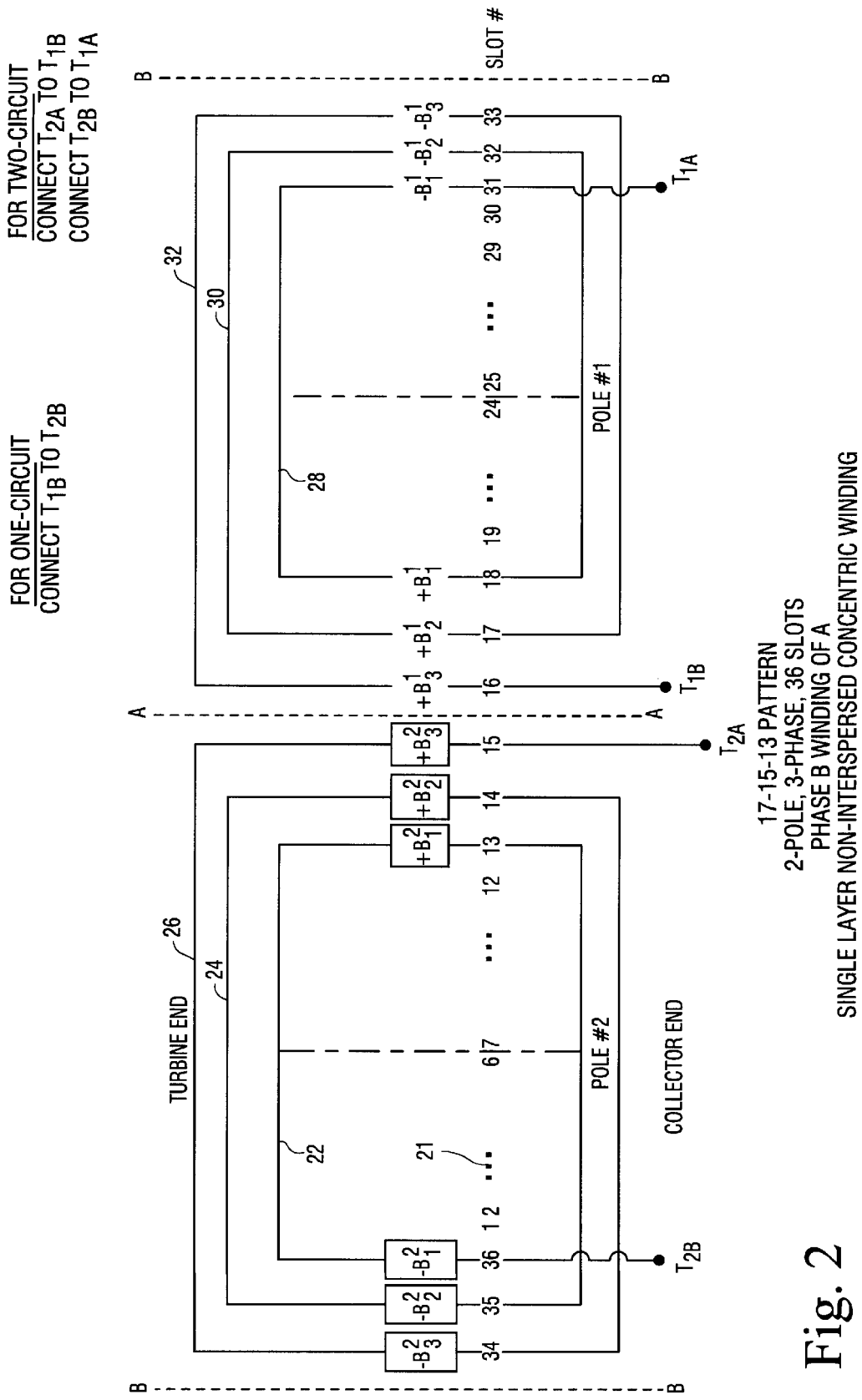
FIG. 2 depicts an exemplary non-interspersed concentric winding for phase winding "B" of a 36 slot, 2-pole, 3-phase turbine generator.

FIG. 2 shows an exemplary single layer non-interspersed concentric winding for a two-pole machine with 36 stator slots which will be used to illustrate the difference between a non-interspersed winding and an interspersed winding in accordance with the present invention. Numerals 1 to 36 as indicated in FIG. 2, designate slot numbers. For the purposes of this discussion, characters A, B, and C represent phase windings of a machine, subscripts 1 through 3 indicate the coil number that a particular stator bar belongs to, and superscripts 1 and 2 indicate whether the coil belongs to pole #1 or pole #2. The (+) designation in front of a letter B indicates axial current flow in a given direction and a (−) designation indicates current flow in an opposite direction to that of the (+) sign. Each pole winding with respect to a phase comprises three coils in series. Each of the coils are generally configured to form into a concentric single layer winding. For simplicity, only phase B is shown in FIG. 2. It will be understood that the configuration of the other two phases (A, C) would be similar to that of phase B as shown in FIG. 2.

Pole #1 and pole #2 are surrounded by concentric coils 22, 24, 26 and 28, 30, 32, respectively. A total of six concentric coils may be provided for each phase winding of this example three phase machine, each phase having two poles. As shown in FIG. 2, and towards the left of dotted line A, coil 22 disposed in slots 36 and 13 is the innermost coil of the three nested coils (22, 24, 26) shown. As one can see, all the coils are concentrically disposed (i.e., nested one inside the other about the same axis), and each coil increases in span by two slots from the innermost to the outermost coil.

Figure 3:
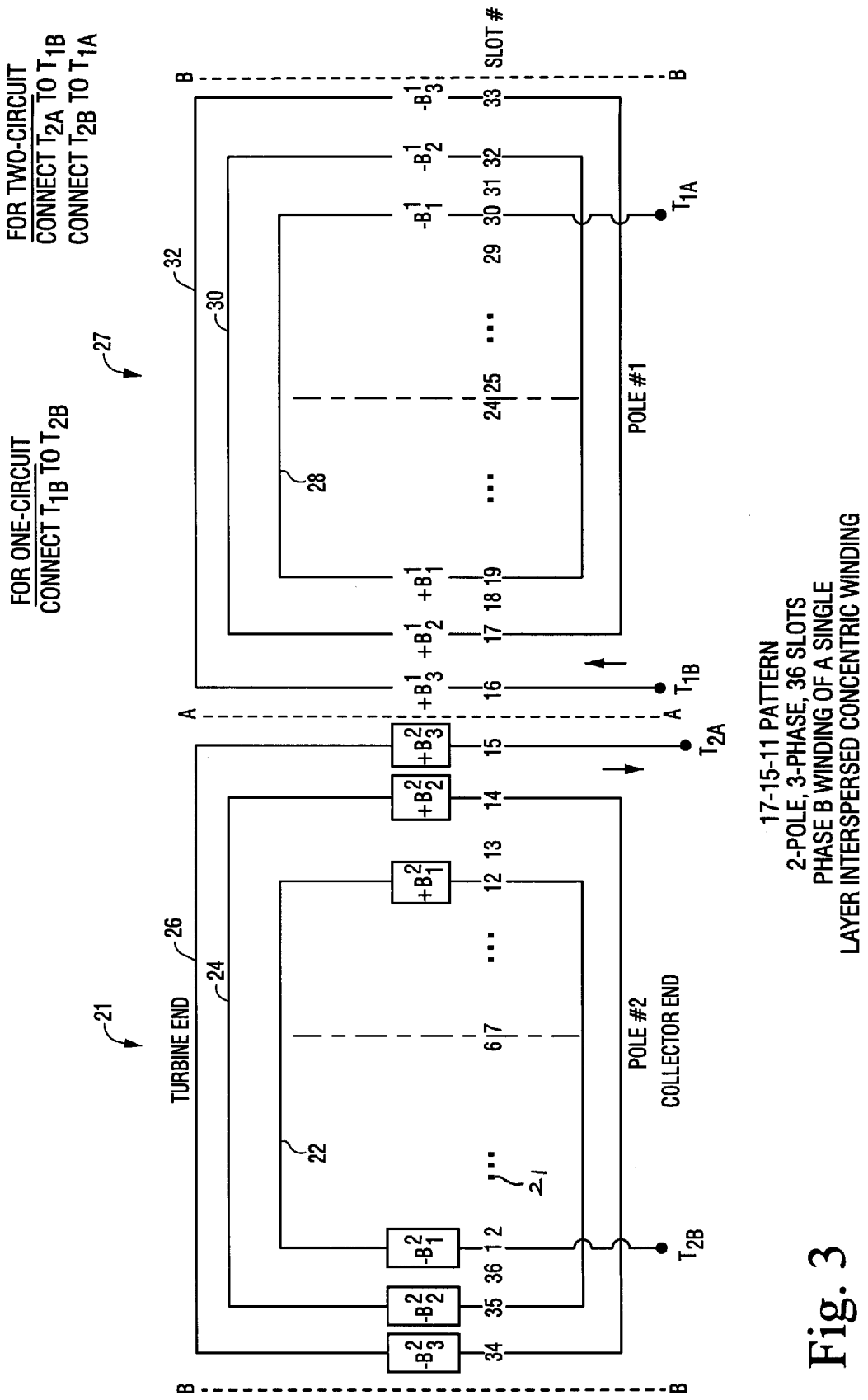
FIG. 3 shows an exemplary single layer interspersed concentric (SLIC) winding arrangement for a single phase winding of a turbine generator according to the present invention.

FIG. 3 shows an exemplary single layer interspersed concentric (SLIC) winding configuration in accordance with the present invention. For the sake of brevity and clarity, a single phase of a 3-phase winding is illustrated. Thus, FIG. 3 shows phase B of the same 36 slot, 2-pole, 3-phase machine as shown in FIG. 2. It should be apparent to one skilled in the art that all the coils are still concentrically disposed.

However, in the SLIC winding shown in FIG. 3, not all of the coils increase in span, with respect to the axis of corresponding phase winding, by 2-slots from the innermost to the outermost coils. A coil disposed in slot 1 and slot 12 is the innermost coil. The next coil in pole #2 is disposed in slots 35 and 14. It will be readily seen that nested coils 22 and 24 are physically spaced 4 slots from each other, i.e., successive nested coils have a span length of greater than two stator slots.

Comparing FIG. 3 with FIG. 2, some of the coils as shown in FIG. 3 are in different slots and may have different spans. In order to achieve varied spacing and thus coil span length, some coils from phase windings A and C may have to be interchanged with some of the coils of phase winding B. Thus, the term interspersion is employed in view of this accommodation of varied spacing.

FIGS. 2 and 3 depict an exemplary 17-15-11 pattern for a 2-pole 3-phase, 36-slot machine where the designation 17 indicates the span in number of slots on the turbine end of the machine of the longest of the three coils on each pole, 15 designates the number of slots spanned by the intermediate coil, and the 11 indicates the number of slots spanned by the shortest span coil. It will be understood that other patterns and that various modifications are possible without deviating from the inventive concept of the present invention. It should also be noted that SLIC windings may comprise of coils with one or more turns each.

Figure 4:
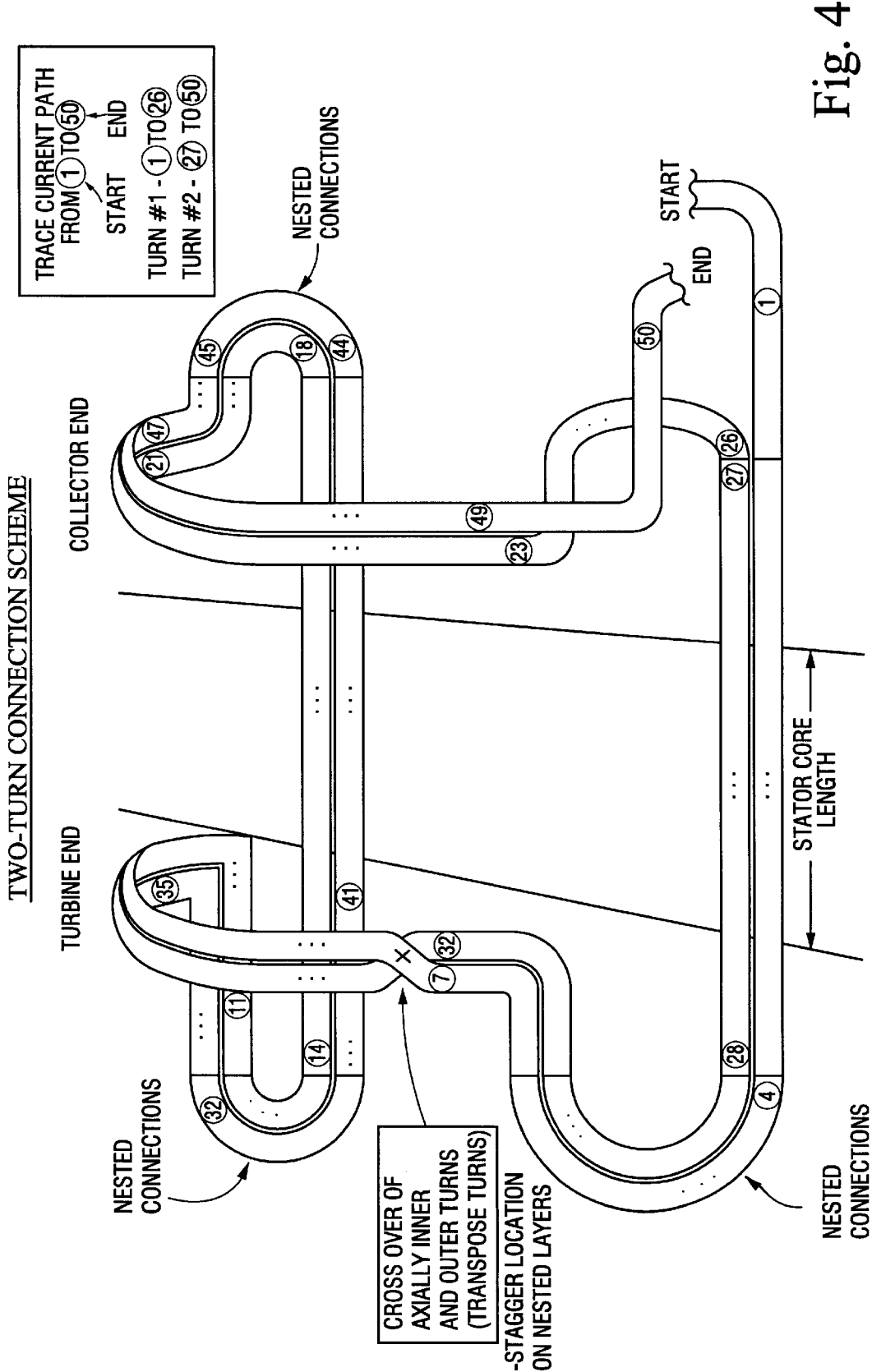
FIG. 4 shows a 2-turn connection scheme for one coil in the SLIC winding as shown in FIG. 3.
Figure 5:
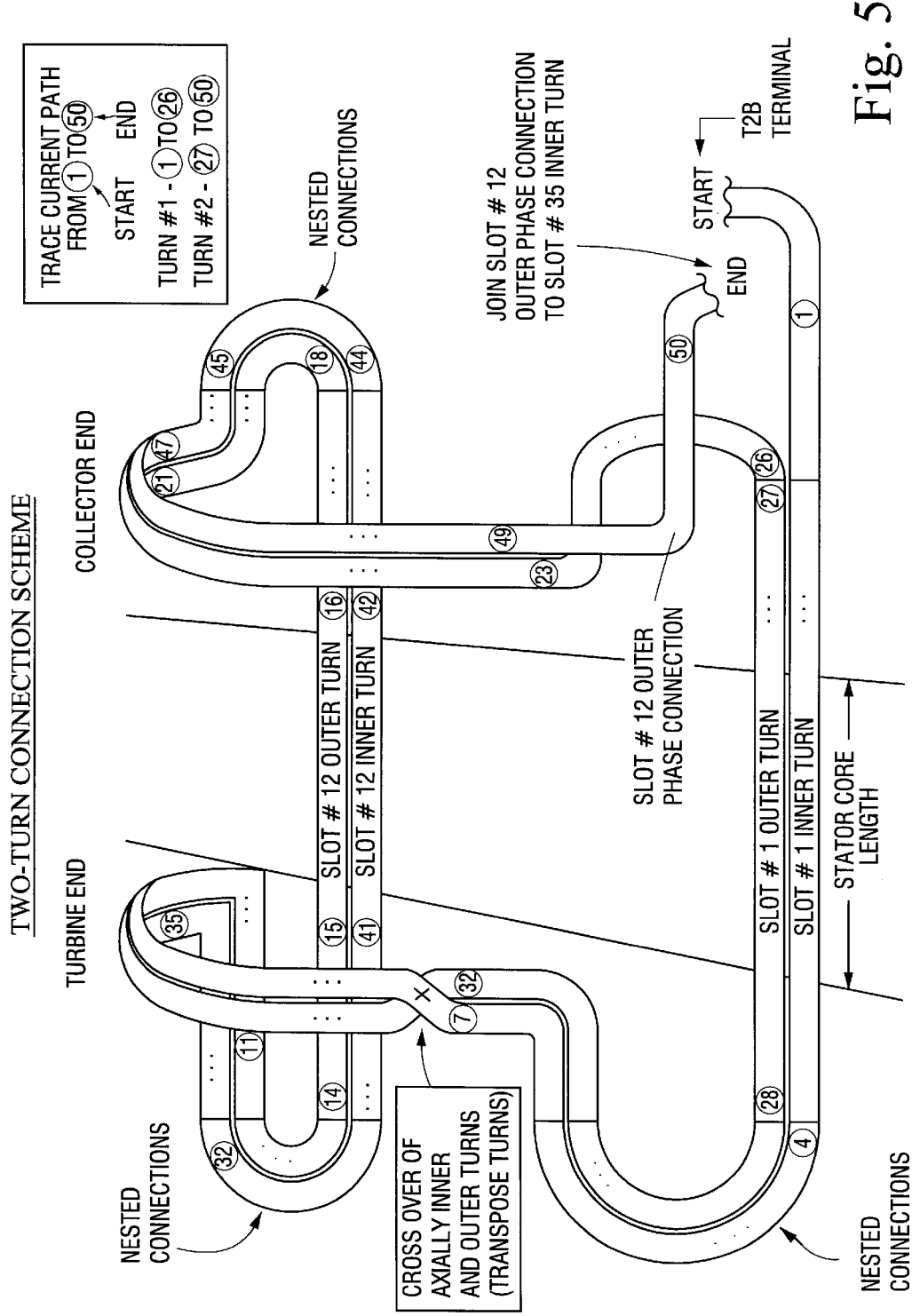
FIGS. 5–7 show the current flow path for the coils of phase B in pole #2 of the SLIC winding as shown in FIG. 3.
Figure 6:
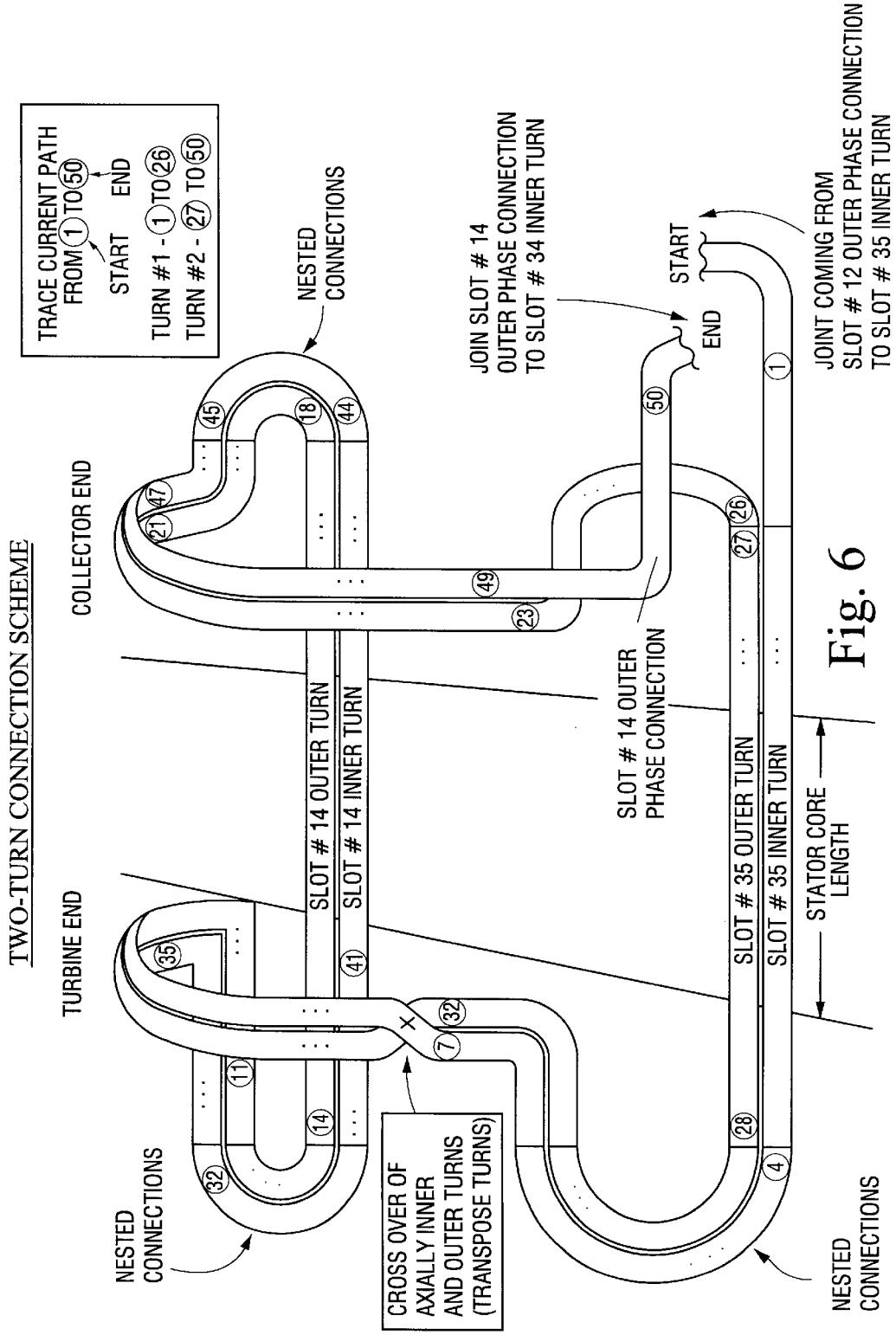
Figure 7:
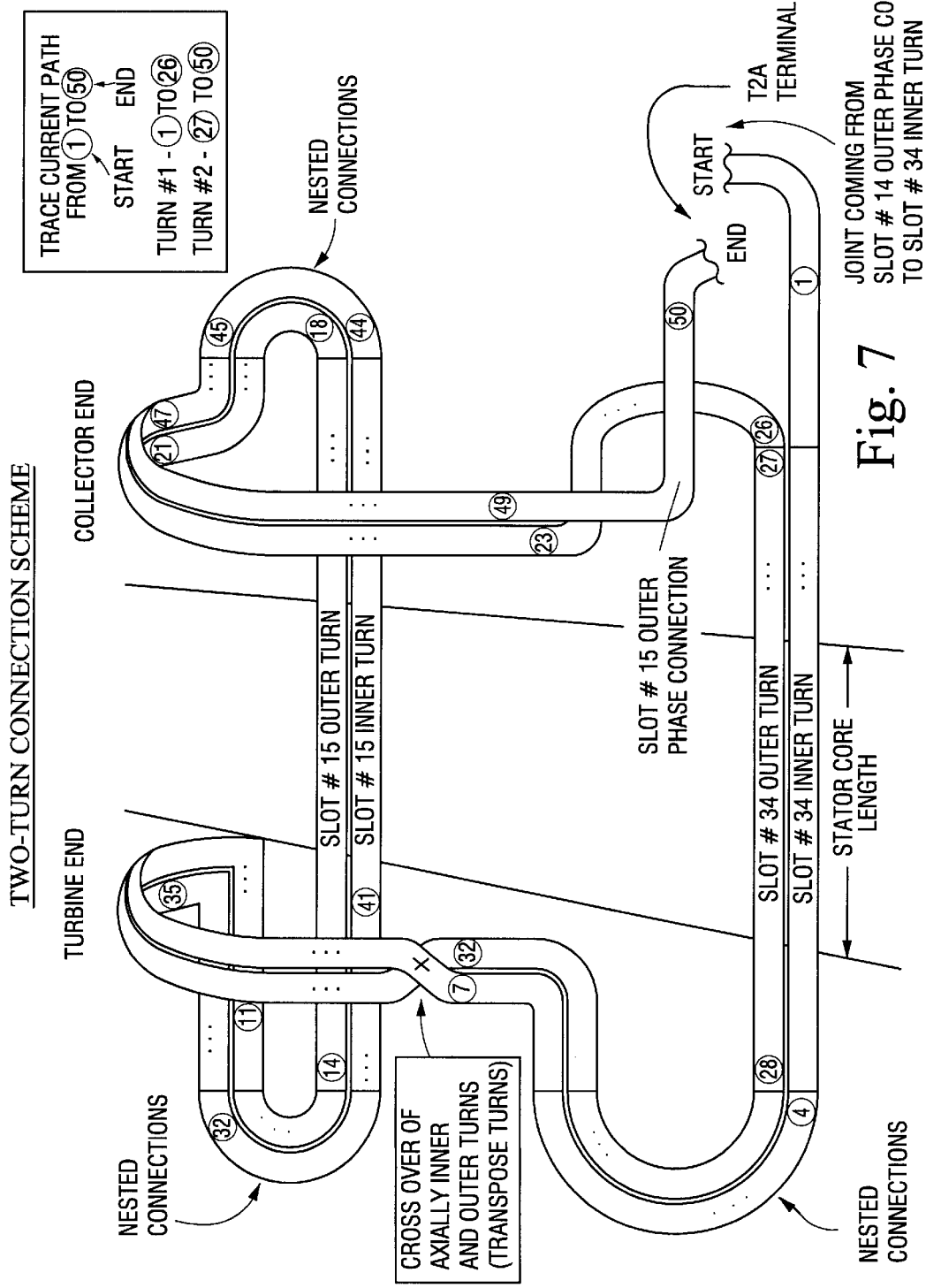

FIG. 4 shows an exemplary 2-turn connection scheme for the SLIC winding as shown in FIG. 3. FIGS. 5–7 collectively illustrate the current flow path and interconnections for the pole #2 phase group of the SLIC winding of FIG. 3.

Figure 8:
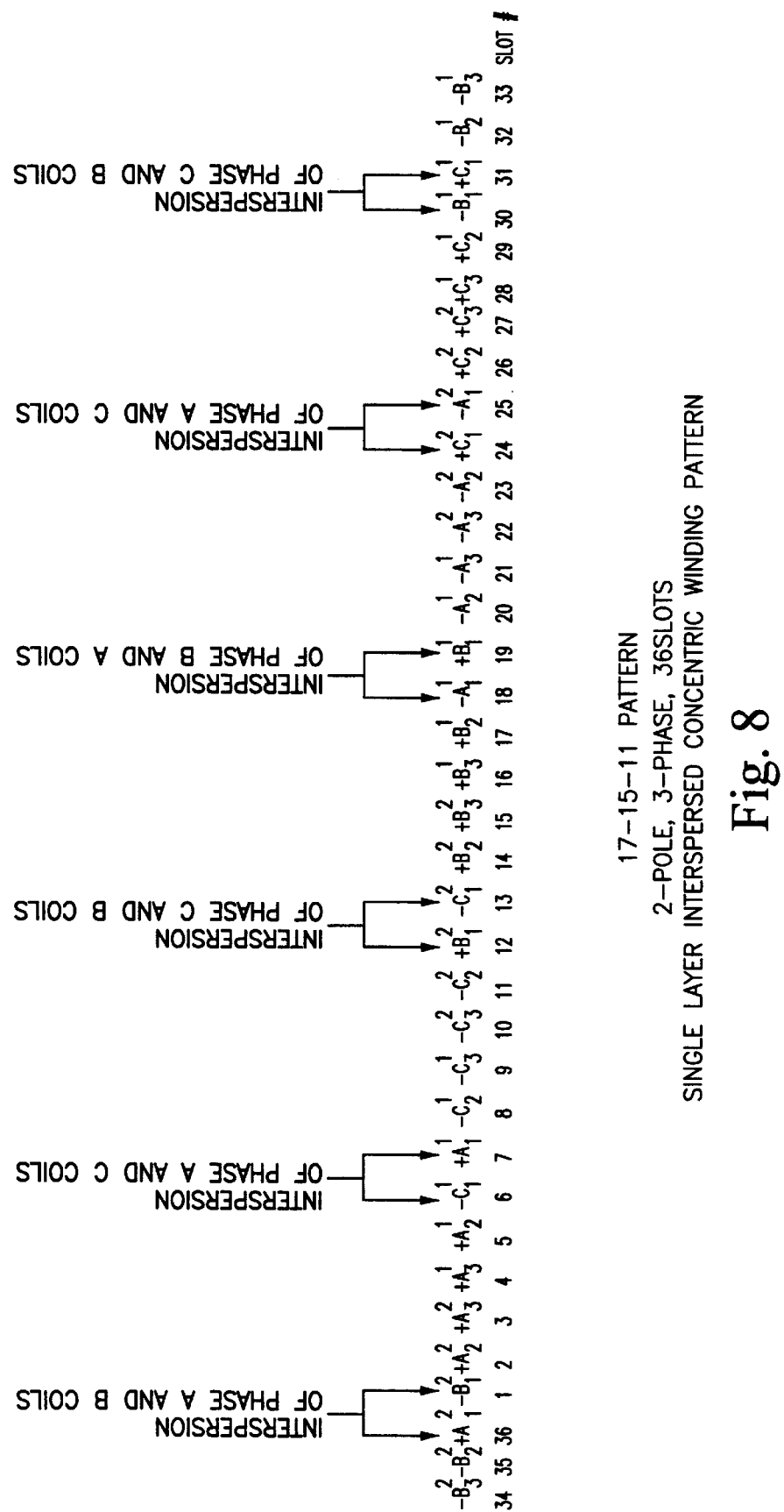
FIG. 8 depicts an exemplary 3-phase winding pattern for the SLIC winding in accordance with the present invention.

FIG. 8 shows a 2-pole, 3-phase winding (pattern only) for all three phases (A, B, and C) for the SLIC winding of FIG. 3. The interspersion locations between the coils of the three phase windings are also indicated in FIG. 8. It will be appreciated that there may be many possible interspersed patterns in which a particular coil or group of coils may be interspersed between the various phases. Also, the number of stator slots may not be restricted to 36 slots. In a two-pole, three-phase machine, one could typically include 24, 30, 36, 42, 48, 54, 60, 66, 72 (or any multiple of 6) number of stator slots.

One skilled in the art would observe that some winding patterns may be better than others for a given number of stator slots due to harmonic MMF and harmonic voltage reduction considerations. An optimum winding pattern for a given number of poles, phases, and stator slots may be obtained by investigating all of the mathematically possible combinations of interspersion of one or more coils between each of the phases, and identifying the pattern that gives the most favorable stator winding magnetomotive force (MMF) wave harmonics and stator terminal voltage waveform harmonics.

Still referring to FIG. 8, the phase C and phase A windings are displaced by 120 and 240 electrical degrees, respectively, from the phase B winding. The + sign indicates current flow in one direction and the − sign indicates current flow in an opposite direction. The subscripts 1–3 indicate the coil number of a particular phase group and superscripts 1–2 indicate whether the coils belong to pole #1 or pole #2, respectively, assuming that the rotor poles are in line with the center line of the phase winding of interest.

It will be appreciated by one skilled in the art that FIG. 8 shows only an example in which the innermost coils at the ends of each phase group for a given core are interspersed. A different coil or combination of coils are capable of being interspersed in accordance with the present invention. For example, FIG. 13 for a 72 slot, 2-pole, three-phase SLIC winding with a 35-33-31-27-25-19 winding pattern exemplifies this concept. In order to match the performance of a double layer lap winding, a best interspersed concentric winding pattern may be required to have a low short circuit pole face loss, low telephone influence factors (TIF), and a fundamental pitch factor which is approximately the same as the product of the fundamental pitch and distribution factors of a double layer lap winding.

Figure 14:
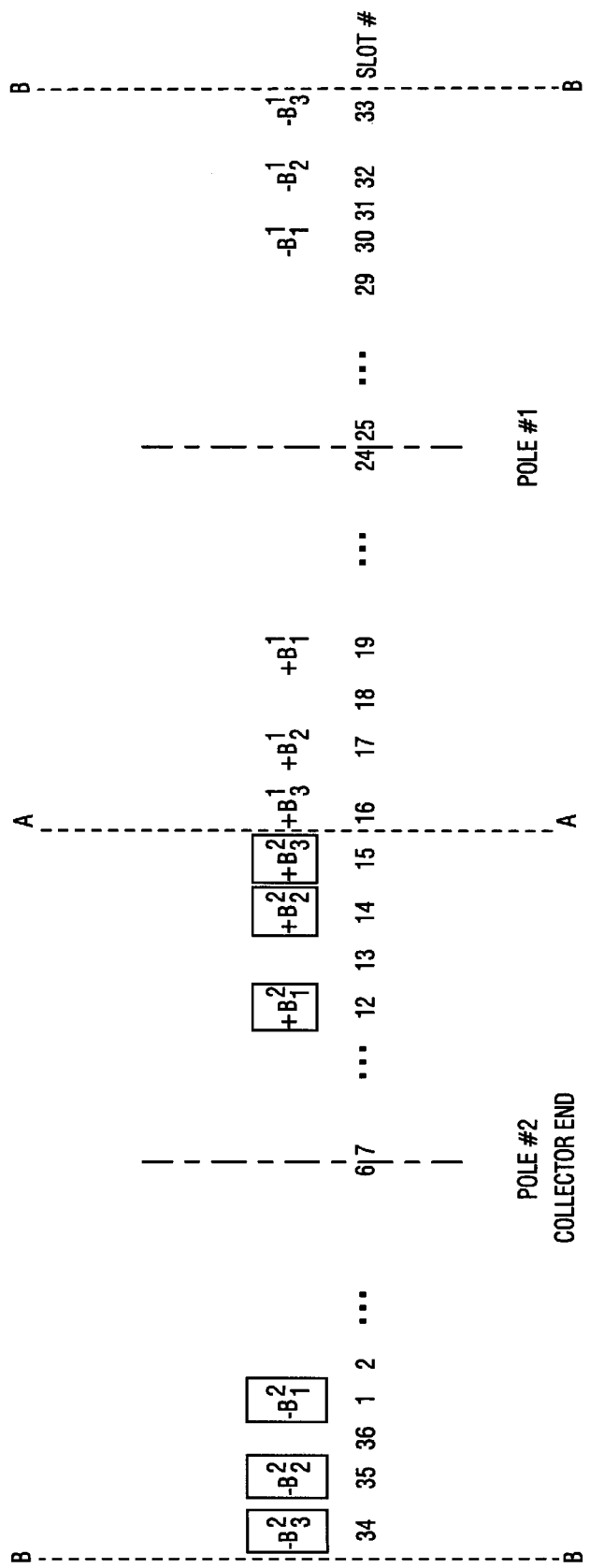
FIG. 14 depicts the details of the phase winding pattern of FIG. 3.

Care must be taken to avoid non-symmetrical winding patterns which may introduce even harmonic components in addition to the odd harmonics components to the armature MMF waveform. These additional harmonics may result in an increased short circuit pole face loss and increased TIF values. An example of symmetry is illustrated in FIG. 14 which shows a SLIC winding pattern as illustrated in FIG. 3. In order to avoid even harmonics, the positive "phase B"

for pole #1 must be a mirror image of the positive "phase B" for pole #2 about the line A—A (FIG. 15), and likewise for the negative "phase B" values about the line B—B.

One skilled in the art will appreciate that, in a SLIC winding pattern within a given a phase group for a given pole, it may be typical to have some coils in adjacent slots and other coils not disposed in adjacent slots.

Continuing with the 2-pole example, it would be possible to connect the two phase groups in FIG. 3 in series to form a one-circuit phase winding connection or, alternatively, in parallel to form a two-circuit phase winding connection. Thus, one and two circuit phase connections are readily achievable for 2-pole single layer windings. However, since a single layer winding has only half as many coils as a double layer lap winding, it may be necessary to adopt a one circuit design to achieve the same terminal voltage as a two circuit double layer lap winding. If a double layer lap winding is a one circuit design with one turn per coil, then there may be two possibilities for generating the same voltage level. The first possibility may require designing the single layer winding as a one circuit, two-turns per coil winding with the same number of stator slots as an existing two-layer lap winding design. The second possible scheme is to design a single layer winding as a one circuit, one turn per coil winding with twice the number of stator slots.

Figure 9:
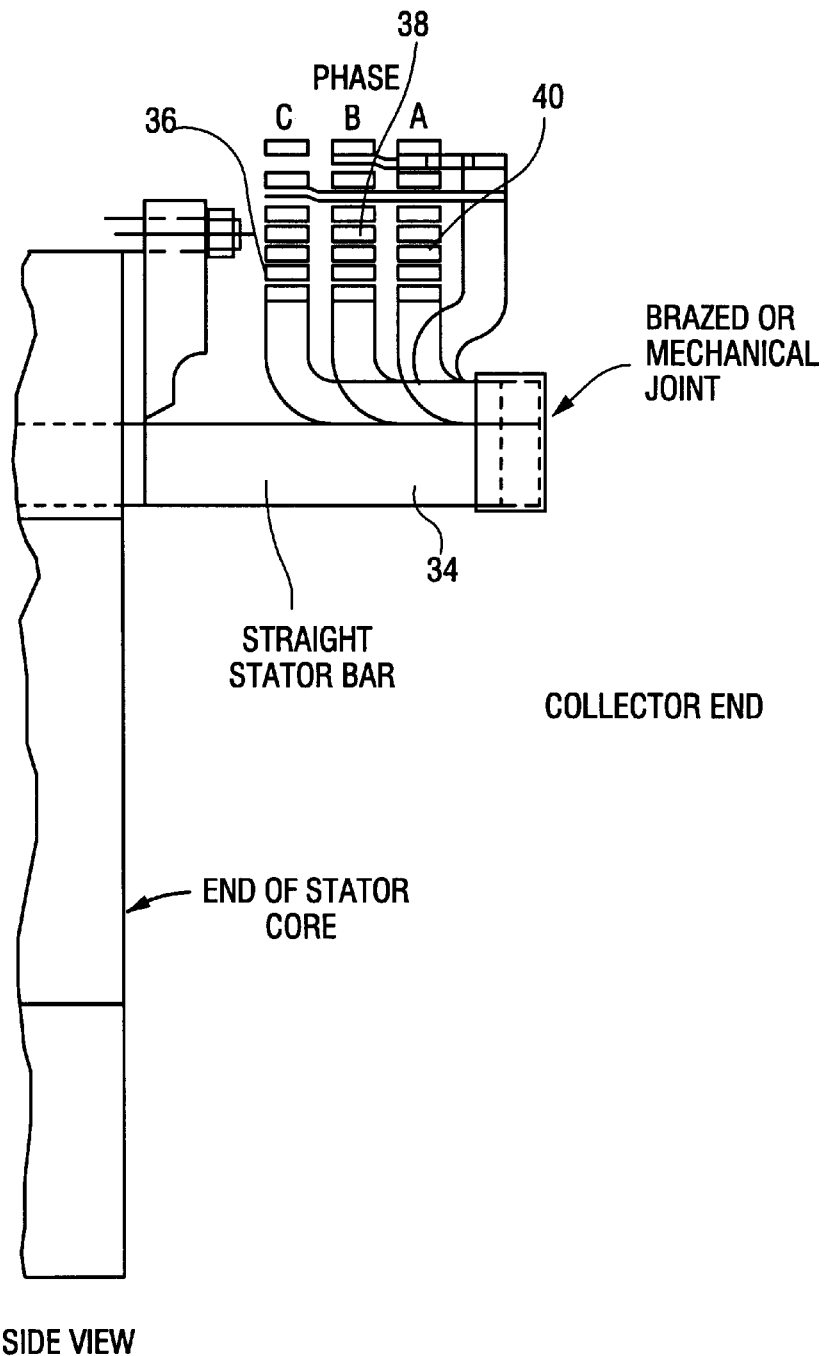
FIGS. 9 and 10 show exemplary side views of winding assemblies for stator windings using SLIC concentric winding schemes having one turn per coil in accordance with the present invention.
Figure 10:
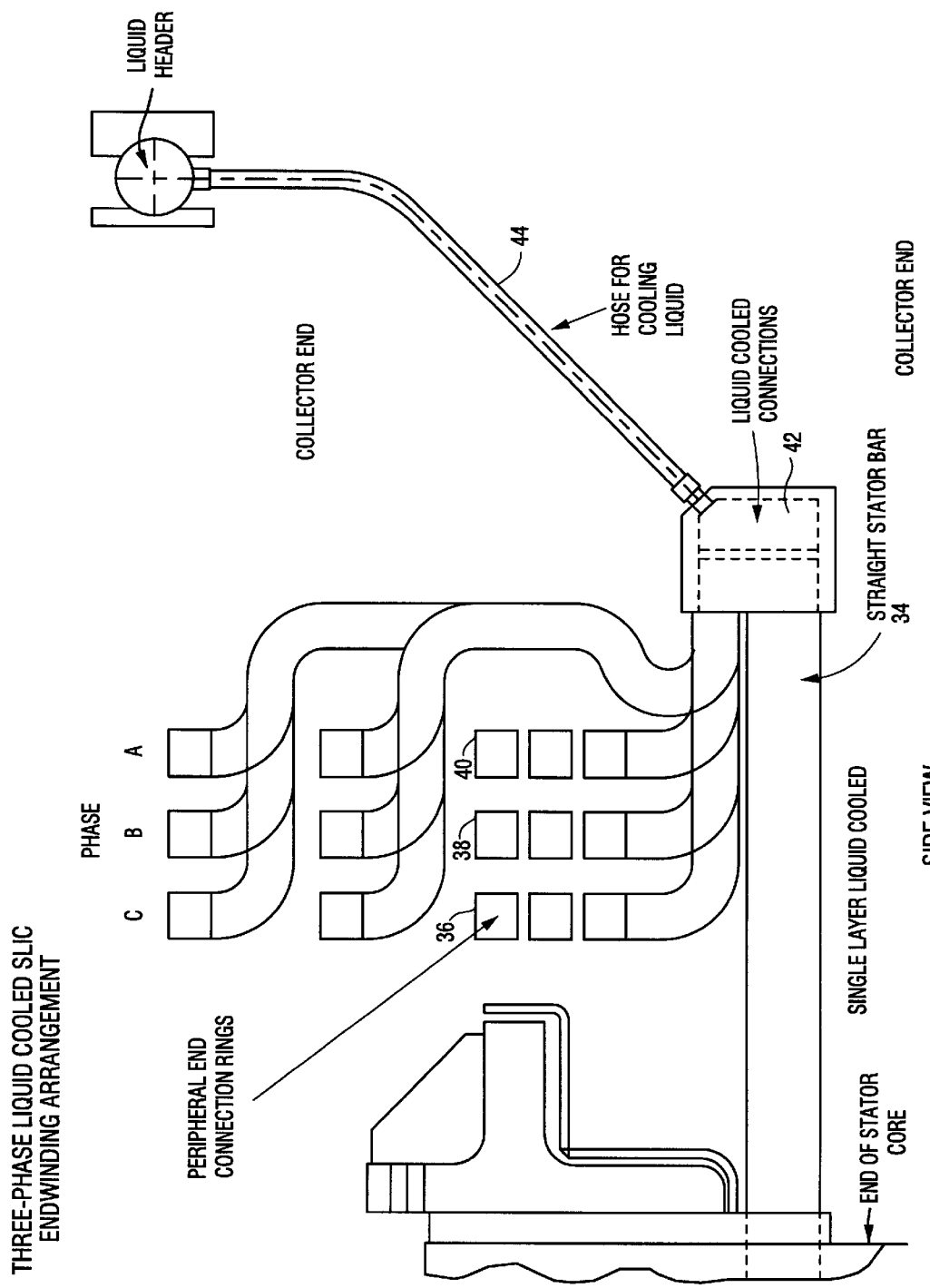

The end winding (located outside the ends of the stator core) in any concentric winding are nested inside one another and are not lapped in the same fashion as a lap winding. FIGS. 9 and 10 show examples of possible winding assemblies for conventional cooled and liquid cooled three-phase stator windings, respectively, using SLIC concentric winding schemes. As shown in FIG. 9, straight stator bar 34 located within the stator slot 14 (FIG. 1) may be connected by means of brazed or mechanical connections to three axial groups of radially nested peripheral end connection rings 36, 38, 40 on one end of a machine. The stator bar 34 and peripheral end connection rings are joined in a liquid cooled connection joint 42 having a hose 44 for supplying cooling liquid. In these exemplary FIGS. 9 and 10, connections are shown towards the collector end. The other end of the machine may have another three axial group of connections, but the innermost and outermost axial groups are interchanged from that of the opposite end to make the lengths of each phase winding substantially similar.

The arrangement of FIGS. 9, 10 allows connections between the straight stator bars 34 and the peripheral end connection rings 36, 38, 40 to be made at similar radial and axial locations. Preferably, all of the joints are made to be similar. It is possible to make the peripheral end connections rings separate from the straight stator bars 34. In addition, the peripheral end connections rings 36, 38, 40 may be made into separate sub-assemblies which may later be attached to the stator core or frame during a winding operation. In such a case, all that may be required is to connect and insulate the joints between the stator bars 34 and peripheral end connection rings 36, 38, 40.

Figure 11:
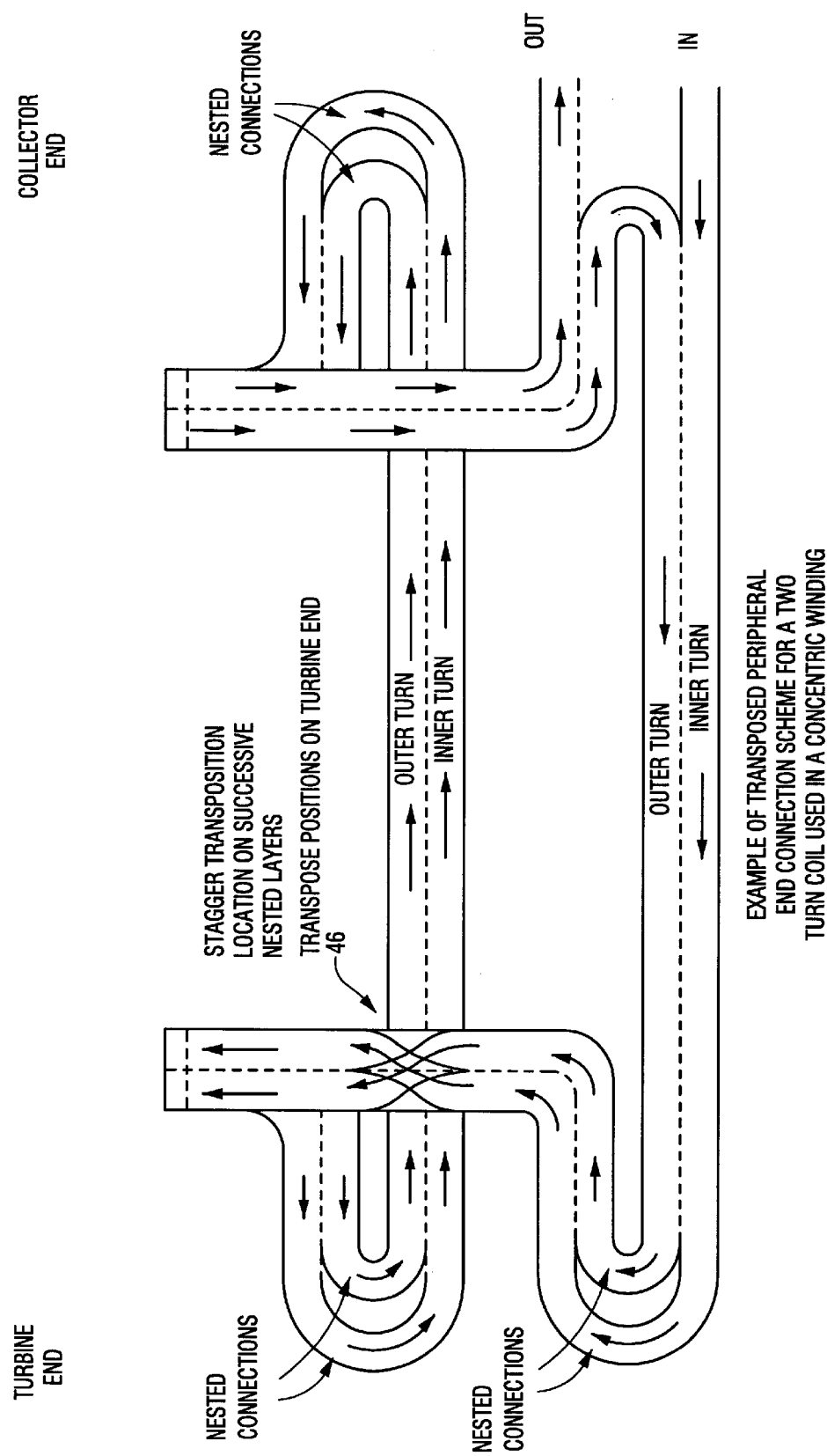
FIG. 11 illustrates an exemplary two-turn SLIC concentric winding scheme illustrating transposed peripheral end connections for a given coil in accordance with the present invention.

FIG. 11 shows an exemplary scheme for making a two turn single layer interspersed concentric winding. The scheme is also described in FIGS. 4 through 7 for the example phase winding of FIG. 3. The arrows in FIG. 11 indicate the direction of current flow through the two-turn coil. The two turns within each peripheral end connection on the turbine end (TE) are transposed as indicated at 46 to make brazing simpler. In this scheme, the two turns (inner turn, outer turn) which make up each particular peripheral end connection ring are transposed on one end of the machine as indicated at 46 in order to simplify the joint assemblies of the stator bars to the peripheral end connection rings and the phase connection rings. This simplification comes from the fact that with this new scheme, the brazed or mechanical turn connection joints are axially nested when the peripheral connection rings are joined to the straight stator bars to form complete coils during a winding operation.

Figure 12:
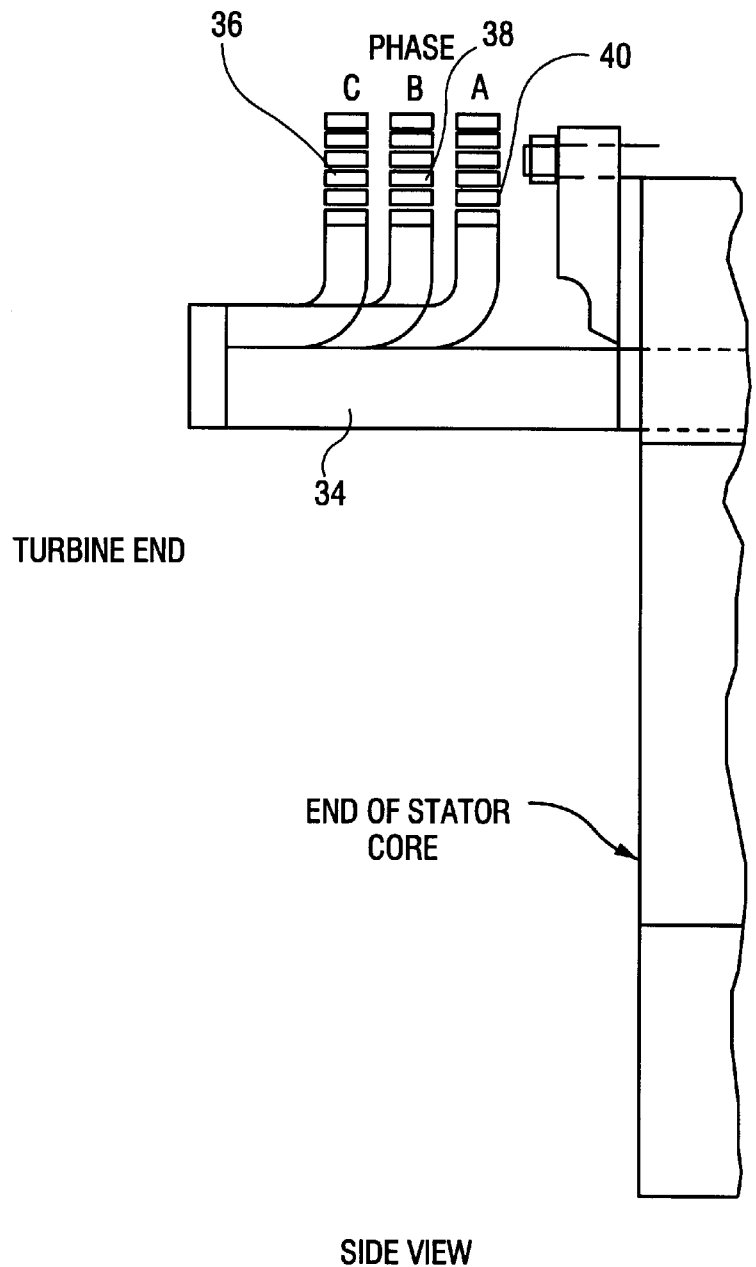
FIG. 12 illustrates an exemplary side view of a subassembly of peripheral connection rings in accordance with the present invention.

FIG. 12 shows the opposite end of the core connections (turbine end) for the winding in FIG. 9. Note that the phases A and C endwinding peripheral connection locations are interchanged axially in FIGS. 9 and 12. Figure further shows the use of straight stator bars, 34 (preferably Roebel transposed) which are placed in the slots of a stator core. The stator bars are then connected to separate end winding nested peripheral connection sub-assemblies to create the stator winding. This may potentially result in cycle time reduction and component design simplification. SLIC windings may also be formed like traditional concentric windings utilizing continuous conductors for the phase groups. It should be noted that, in theory, any type of conductor material including insulated cable, coaxial cables, super-conducting materials may be used for manufacturing SLIC windings.

It may be possible to have all of the peripheral connection rings 36, 38, 40 contained as part of six separate sub-assemblies per end (either a turbine end or a collector end) for the 2-pole, three-phase machine example. The ability to make peripheral connection rings separately from the straight bars and the ability to make rings into separate sub-assemblies offers the possibility of significant cycle time reduction. The number of peripheral connection rings are merely exemplary. The number of connection rings may be increased or decreased depending on a specific application.

It will be appreciated that the concept of a single layer interspersed concentric windings may be extended to double layer interspersed concentric windings. This may open the possibilities of obtaining harmonic reduction by having a phase displacement between the separate phase winding layers.

It will be further appreciated that the SLIC windings may be connected for either one-circuit-per-phase or two-circuits-per-phase for a 2-pole generator of FIG. 3 as described earlier.

Figure 13:
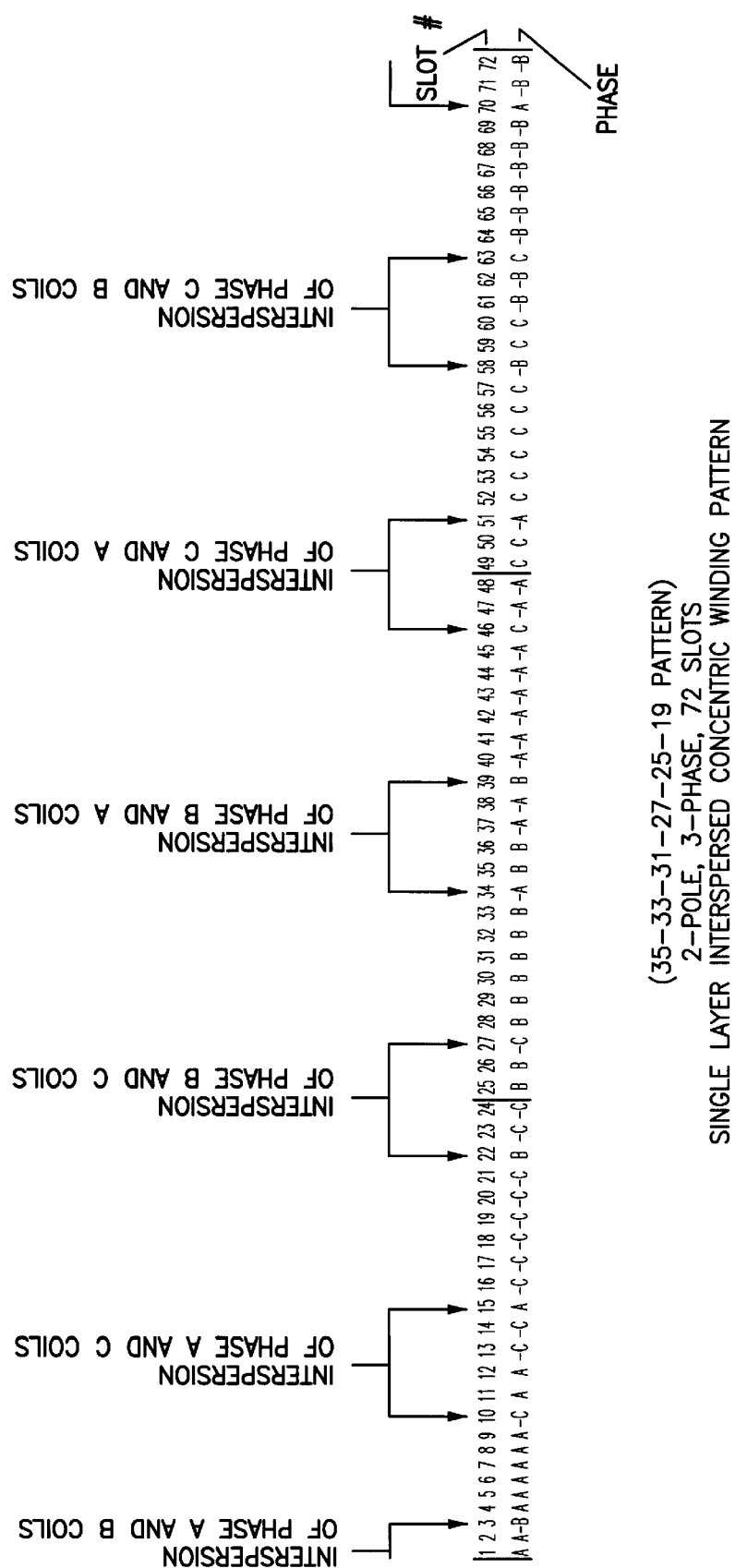
FIG. 13 illustrates an exemplary 2-pole, 3-phase, 72 slot single layer interspersed concentric (SLIC) stator winding pattern in accordance with the present invention.

Referring now to FIG. 13, there is shown an exemplary 2-pole, 3-phase, 72 slot single layer interspersed concentric stator winding pattern. Here, the coils that are interspersed are clearly pointed out. The exemplary stator winding pattern is a 35-33-31-27-25-19 pattern and is used to illustrate a more complicated SLIC winding arrangement.

FIG. 14 illustrates the details and pattern symmetry of the phase B winding pattern as shown in FIG. 8 and illustrates the pattern symmetry as previously described.

The advantages of the present invention include reduction of cycle time on stator winding assembly thus allowing the manufacture of straight stator bars. Changing spans and interspersing certain coils of each phase of the concentric windings helps to reduce certain harmonic MMFs and harmonic voltages responsible for extra losses and interference with telephone circuits. Further, optimal interspersed winding patterns may be determined for a given number of stator slots, poles, and phases to minimize the undesirable harmonic content in a stator winding MMF waveform and in a stator winding terminal voltage waveform. This SLIC winding pattern reduces parasitic losses and associated heating of rotor surface current carrying components and rotor windings. Another benefit of the SLIC winding concept is that the reduction in harmonic content in the stator winding terminal voltage waveform results in lower values of Telephone Influence Factors (TIF).

Other advantages include the following: (a) manufacture of end winding sections as sub-assemblies independent of stator bars which permits to have end winding copper cross-section shapes different from bar copper cross-section shapes; (b) concentric end winding geometry is relatively simple to mechanically brace (c) the freedom to use different insulation systems for end winding sections and bar sections of the windings; (d) potential for simplification of stator wedge system since bar force is always directed in radially outer direction; (e) easy to remove straight bars for repair or replacement; (f) the Roebel transposed strands in a bar may also be extended outside the length of the core, if desired; (g) more copper can be put in slots since less ground insulation space is needed for single layer verses two layer winding construction; (h) brazed connections are made well away from core end with fewer number of brazes; (i) this configuration is adaptable to liquid cooling or inner gas cooling of bars; and (j) potential for better dimensional control of end winding connections.

Although the above description is provided for a 2-pole machine, it will be appreciated that the inventive concept of the present invention may be extended to describe machines having more than two poles and any number of phases. In addition, the examples and description have been given for turbine generators, but, in fact, the inventive concept may be applied to rotating machines in general.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyphase electrical machine having a fixed number of poles, comprising:
   at least one stator, each said stator having a plurality of slots and a plurality of single layer phase windings, each of said single layer phase windings having a plurality of concentric coils; and
   one or more concentric coils among said plurality of concentric coils of one single layer phase winding are interspersed with said one or more concentric coils of at least another single layer phase winding in a same radial positioning in the slots of the stator to reduce harmonics and parasitic losses in said electrical machine having a fixed number of poles.

2. The machine of claim 1, wherein one or more of the stator slots comprise a conductor.

3. The machine of claim 1, wherein one or more of the stator slots comprise a stator bar.

4. The machine of claim 1, wherein said concentric coils are made of insulate cable material.

5. The machine of claim 1, wherein said concentric coils are made of superconductor materials.

6. The machine of claim 1, wherein each concentric coil is formed using a continuous conductor.

7. The machine of claim 1, wherein end connection rings of said concentric coils are nested inside one another.

8. The machine of claim 7, wherein each concentric coil has at least two turns.

9. The machine of claim 8, wherein said at least two turns are transposed to simplify joint assemblies of stator bars to said end connection rings.

10. The machine of claim 9, further comprises: means for supplying cooling liquid to cool said end connection rings and stator windings.

11. The machine of claim 7, wherein each stator bar is connected to said end connection rings.

12. The machine of claim 7, wherein each coil has one turn.

13. A method of reducing harmonic content and parasitic losses in an electrical machine having a fixed number of poles, said method comprising:
   providing at least one stator, each said stator having a plurality of slots and a plurality of single layer phase windings, each said single layer phase winding having a plurality of concentric coils; and
   peripherally interspersing one or more concentric coils of one single layer phase winding with one or more concentric coils of at least another single layer phase winding in a same radial position of the slots of the stator.

14. The method of claim 13, further comprising:
   connecting one of concentric coils of one of said single layer phase windings in one of a series, parallel, or a combination of series and parallel configurations with another one of the coils of said one of the single phase windings; and
   locating a stator bar in one or more of said stator slots.

15. The method of claim 14, further comprising:
   providing end connection rings to each concentric coil;
   providing each of said concentric coils with at least two turns; and
   transposing said at least two turns to simplify joint assemblies of stator bars to said end connection rings.

16. A polyphase electrical apparatus, comprising:
   at least two poles, the number of poles being fixed, each said pole having a plurality of single layer phase windings, each said single layer phase winding comprising a plurality of concentric coils disposed in corresponding armature core slots such that the plurality of concentric coils disposed in said armature core slots are formed into a nested peripheral endwinding arrangement; and
   at least one concentric coil of one single layer phase winding is peripherally intersperse with at least one concentric coil of at least another single layer phase winding in a same radial positioning of said slots to reduce harmonics and parasitic losses in said electrical apparatus.

17. The apparatus of claim 16, wherein said coils are made of insulated cable material.

18. The apparatus of claim 16, wherein said coils are made of superconductor materials.

19. The apparatus of claim 16, wherein each said coil is formed using a continuous conductor.

20. The apparatus of claim 16, wherein each said coil has at least two turns.

21. An electrical apparatus having a fixed number of poles, comprising:
   at least one stator, said at least one stator comprising single layer interspersed phase windings and a plurality of slots, at least one of said single layer interspersed phase windings comprising a plurality of nested coils, each nested coil centered on a axis of said phase winding; and
   wherein one or more successive said nested coils among said plurality of nested coils of said at least one of said single layer interspersed windings have a span length of greater than two stator slots to reduce harmonic content and parasitic losses in said apparatus having a fixed number of poles.

22. The apparatus of claim 21, wherein one or more said stator slots among aid plurality of slots include a conductor.

23. The apparatus of claim 21, wherein one or more said stator slots among said plurality of slots include a stator bar.

24. The apparatus of claim 21, wherein said nested coils are made of insulated cable material.

25. The apparatus of claim 21, wherein said nested coils are made of superconductor materials.

26. The apparatus of claim 21, wherein each said nested coil is formed of continuous conductor.

27. The apparatus of claim 21, wherein end connections of said nested coils are nested inside one another.

28. A method of reducing harmonic content and parasitic losses in an electrical apparatus having a fixed number of poles, said method comprising:

provideng at leas one stator in said electrical apparatus having a fixed number of poles, said at least one stator having single layer interspersed phase windings and a plurality of slots, at least one of said single layer interspersed phase windings comprising a plurality of nested coils, each said coil centered on the axis of said phase winding; and disposing each said nested coil in at least one of said plurality of slots, said at least one of said plurality of slots being centered about an axis of said single layer phase winding, and wherein one or more successive nested coils among said plurality of nested coils of said at least one of said single layer interspersed windings have a span length of greater than two stator slots.

29. The method of claim 28, further comprising:

connecting one of said plurality of the nested coils of said single layer phase winding with another one of said plurality of the nested coils of said single layer phase winding in one of a series, parallel, or a combination of series and parallel configurations; and locating a stator bar in one or more of said stator slots.

30. The method of claim 28, further comprising:

providing peripheral end connection rings to each said nested coil;

providing each said nested coil with at least two turns; and transposing said a least two turns to simplify joint assemblies of stator bars to said end connection rings.

* * * * *

UNITED STATES PATENT AND TRADEMARK OFFICE
CERTIFICATE OF CORRECTION

PATENT NO. : 6,570,290 B2
DATED : May 27, 2003
INVENTOR(S) : Kazmierczak

It is certified that error appears in the above-identified patent and that said Letters Patent is hereby corrected as shown below:

Column 11,
Line 56, kindly change "insulate" to -- insulated --.

Column 12,
Line 45, kindly change "intersperse" to -- interspersed --.
Line 64, kindly change "a axis" to -- an axis --.

Column 13,
Line 6, kindly change "aid" to -- said --.
Line 14, kindly change "of continuous" to -- of a continuous --.
Line 20, kindly change "leas" to -- least --.

Column 14,
Line 21, kindly change "a least" to -- at least --.

Signed and Sealed this

Twenty-second Day of July, 2003

JAMES E. ROGAN
*Director of the United States Patent and Trademark Office*